UNITED STATES PATENT OFFICE.

KARL LANGENBECK, OF BOSTON, MASSACHUSETTS.

VITRIFIED PAVING-BRICK.

937,822.

Specification of Letters Patent.

Patented Oct. 26, 1909.

No Drawing.

Application filed December 16, 1908. Serial No. 467,868.

*To all whom it may concern:*

Be it known that I, KARL LANGENBECK, a citizen of the United States, residing at Boston, in the county of Suffolk and State of Massachusetts, have invented certain new and useful Improvements in Vitrified Paving-Brick, of which the following is a specification.

This invention relates to vitrified paving bricks or blocks consisting essentially of a vitrified mixture of sieved coal ashes possessing the capability of felting, with a bond of clay which in the mixture and in presence of the ash is more fusible than the ash.

A preferred composition for making this brick or block consists of from two to three parts by weight of sieved coal ashes commingled with one part of blue, boulder or alluvial clay. The proportion of ash may vary considerably in accordance with the quality of the ash and the character of the clay, but should be in all cases sufficient to permit felting of the ash component of the composition. I have found that a mixture of this character, on addition of water, yields a body which may be compacted without lamination into a brick or block of remarkable density. This is apparently due to the property possessed by sieved coal ashes, that is to say the non-fused and refractory portion of the ash as distinguished from the more basic and fusible portion known as clinker, in presence of a moderate and not excessive proportion of a clay bond, of felting under pressure. This body, like the shales and the comparatively rare paving brick clays, vitrifies very gradually under the increasing heat of the kiln, this characteristic of undergoing slow vitrification being the essential requirement for the production of paving bricks. It is thus evident that the qualities of the material are primarily due to its chief constituent, sieved coal ashes possessing the capability of felting, suitably bonded and compressed, and which may be present in proportions of 60 to 75% by weight of the body.

I am aware that it has been proposed to make a fire-brick from a mixture of hard-coal ashes, shale and fire-clay, but a composition of this character is entirely unsuited for my purposes. Fire-bricks are primarily intended to resist high temperatures with repeated heating and cooling without cracking, and are therefore formed from difficultly fusible clays or from mixtures of clay with inert or infusible materials, usually pulverized or ground burnt fire-clay, termed grog or grit, the composition remaining porous at the maximum temperature at which it is to be used. Paving bricks on the other hand are required to withstand frost and abrasion. Porous bricks or fire-bricks are useless for this purpose as either of these agencies would quickly destroy them. Paving bricks must be vitreous in fracture to the point of being practically non-absorptive, without being brittle. Such vitreous bricks are useless as fire-bricks, even if used at a temperature lower than that at which they softened or vitrified in the original baking, because on re-heating or in the course of the repeated heatings of the furnace walls, they would crack and spall after a very short period of use.

I claim:

As a new article of manufacture, a paving brick or block consisting essentially of sieved coal ashes, possessing the capability of felting and constituting the refractory portion of the ash, and a bond of clay which is more fusible than the ash, the proportion of the bond being insufficient to prevent felting of the ashes, said brick being practically non-absorptive and having a vitreous fracture.

In testimony whereof, I affix my signature in presence of two witnesses.

KARL LANGENBECK.

Witnesses:
HENRY J. BOWEN,
HARRIETT A. DANN.